(12) United States Patent
Mitchell

(10) Patent No.: US 7,430,666 B2
(45) Date of Patent: Sep. 30, 2008

(54) AUTHENTICATION OF A REMOTE USER TO A HOST IN A DATA COMMUNICATION

(75) Inventor: Christopher John Mitchell, Surrey (GB)

(73) Assignee: Royal Holloway and Bedford New College, Egham, Surrey (GB)

( * ) Notice: Subject to any disclaimer, the term of this patent is extended or adjusted under 35 U.S.C. 154(b) by 695 days.

(21) Appl. No.: 10/493,799

(22) PCT Filed: Nov. 1, 2002

(86) PCT No.: PCT/GB02/04982

§ 371 (c)(1),
(2), (4) Date: Oct. 4, 2004

(87) PCT Pub. No.: WO03/041357

PCT Pub. Date: May 15, 2003

(65) Prior Publication Data

US 2005/0050326 A1   Mar. 3, 2005

(30) Foreign Application Priority Data

Nov. 3, 2001   (GB) ................... 0126426.6

(51) Int. Cl.
*H04L 9/00* (2006.01)
(52) U.S. Cl. .......................................... 713/182; 726/2
(58) Field of Classification Search ................... 713/182
See application file for complete search history.

(56) References Cited

U.S. PATENT DOCUMENTS

| 5,841,871 | A | * | 11/1998 | Pinkas | 713/155 |
| 6,073,234 | A | | 6/2000 | Kigo et al. | |
| 6,889,322 | B1 | * | 5/2005 | Levy | 713/168 |
| 2002/0002681 | A1 | * | 1/2002 | Kawano et al. | 713/180 |
| 2003/0033524 | A1 | * | 2/2003 | Tran et al. | 713/168 |

FOREIGN PATENT DOCUMENTS

| EP | 0673178 | 9/1995 |
| WO | 98/52115 | 11/1998 |

* cited by examiner

*Primary Examiner*—Matthew B Smithers
(74) *Attorney, Agent, or Firm*—Leydig, Voit & Mayer, Ltd.

(57) ABSTRACT

An aim of the invention is to provide an authentication method which retains the advantages of the S/KEY system while offering improved resistance to host impersonation attacks.

15 Claims, No Drawings

AUTHENTICATION OF A REMOTE USER TO A HOST IN A DATA COMMUNICATION

CROSS-REFERENCE TO RELATED APPLICATIONS

This application is related to and claims priority to PCT/GB02/04982, the entire contents of which is incorporated by reference herein.

STATEMENT REGARDING FEDERALLY SPONSORED RESEARCH OR DEVELOPMENT (None)

THE NAMES OF THE PARTIES TO A JOINT RESEARCH AGREEMENT (None)

INCORPORATION BY REFERENCE OF MATERIAL SUBMITTED ON A COMPACT DISC (None)

BACKGROUND OF THE INVENTION

Field of Invention

This invention relates to authentication of a remote user to a host in a data communication system.

Such authentication normally requires the use of the user's secret passphrase, which is entered into a remote computer device to enable the system to be used. A cryptographic function of the password is then generated by the remote computer device and sent to the host computer. The password may be processed by sophisticated asymmetric cryptographic techniques using public key/private key pairs. This provides great security, but needs considerable computing power at the remote computer device, and so is not suitable where that device has limited computational power, being for example a smart card. In such a situation a symmetric cryptographic technique, which requires much less computational power, may be used to process a one-time password to be sent to the host. One such system is known as S/KEY, details of which have been published as Internet RFC 1760. In the S/KEY system, because each password is used only once, an attacker who intercepts the password may not be able to use it, except in a 'host impersonation' attack, where a false host obtains information from the remote user which can be used to impersonate the remote user to the genuine host on a later occasion. However, the S/KEY system has the important advantage that the host does not need to store secret information about the remote user device. The information that is stored (known as public information) is not in itself sufficient to enable an attacker to masquerade as the remote user.

BRIEF SUMMARY OF THE INVENTION

According to a first aspect of the present invention, a method of authenticating a remote user to a host computer in a data communication system where the remote user uses a remote computer device, comprises storing a set of verification values at the host computer, and during an authentication process sending data from the remote computer device to the host computer to enable authentication of the remote user by the host computer using the set of verification values, together with data including a next set of verification values calculated by the remote computer device.

BRIEF DESCRIPTION OF THE SEVERAL VIEWS OF THE DRAWING(S)

(None)

DETAILED DESCRIPTION OF THE INVENTION

With this method, the host computer stores the verification values, and no secret information about the remote user or the remote computer device. Further, because during an authentication process the remote computer device sends the host the set of verification values for the next authentication process, any host impersonation attack must be able to intercept or deduce two sets of verification values to be successful. This provides increased security.

Preferably, the host computer verifies the next set of verification values before storing them in place of the previous set.

Preferably, the host computer stores a current data string and a current set of verification values calculated by the remote computer device using the current data string and a current set of secret keys chosen and stored by the remote computer device, and the method includes:

at the remote computer device, choosing a next data string and a next set of secret keys, calculating the next set of verification values using the next data string and the next set of secret keys, and calculating a set of check values using the next set of verification values and the current set of secret keys;

the transmission of the next data string, the next set of verification values and the set of check values in encrypted form from the remote computer device to the host computer;

at the host computer, choosing at random, a subset of the current set of keys, and obtaining that subset of the current set of keys in encrypted form from the remote computer device;

at the host computer, verifying the corresponding subset of the current set of verification values using the current data string and the subset of the current set of keys;

then the verification of the corresponding subset of the set of check values using the next data string and the subset of the current set of keys; and the replacement of the current data string and current set of verification values with the next data string and next set of verification values.

In this case only the data string and the verification values are stored at the host computer, which still does not store any secret information about the remote user.

Further, because the method uses the current keys to verify both the current set of verification values and the next set of verification values (via the check values), each time the remote user is authenticated the host is provided with and has verified the next set of verification values of the next authentication. Although secret keys are sent from the remote computer device to the host computer, only a subset of the keys is sent, so that if this is intercepted by an attacker it is unlikely that the attacker has the subset required when trying to impersonate the remote computer device to the host on a later occasion, so that the verification procedure at the host will fail. This therefore offers improved security.

The invention offers particular advantages where the encryption is symmetric, as it does not require a great deal of computational power. Further, the memory required by the remote computer device, for example on a smart card, can also be minimised.

Conveniently the verification values are calculated using a message authentication code (MAC) algorithm. The use of such an algorithm proves that the information used to calculate the values is known, while not actually revealing it. Using such an algorithm also tends to minimise the storage needed for the values.

In order to maintain the security of the method while minimising the data that is stored, particularly by the remote user, the number of secret keys in a set, and the number in the subset, must be chosen carefully. In practice, the number of secret keys in a set will be between 35 and 200, with the number in the subset being less than or equal to half of the number in the whole set.

A further improvement to resistance against host impersonation attacks is made if the subset of the current set of secret keys is chosen by a procedure involving both the remote computer device and the host.

The method may be implemented in different ways, according to whether data to be stored or the amount of data transmitted/number of data transmission is to be limited.

In a first embodiment, where data storage is minimised, the host computer stores one data string and one set of verification values, while the remote computer device stores one set of secret keys and the data string, and during the authentication process there are three transmissions of data, firstly from the remote computer device to the host, sending the next data string, the next set of verification values and the set of check values, secondly from the host to the remote computer device sending the subset chosen at random, and thirdly from the remote computer device to the host, sending the subset of the current set of keys.

In a second embodiment, where the number of data transmissions is minimised, the host computer stores current and pending data strings, the corresponding two sets of verification values, each calculated from a corresponding set of secret keys, and a set of check values, while the remote computer device stores the two sets of secret keys and the current pending data strings, and during the authentication process there are two transmissions of data, firstly from the host to the remote computer device sending the subset chosen at random and secondly from the remote computer device to the host, sending the subset of the current set of keys, together with the next data string, the next set of verification values and the corresponding set of check values.

In this embodiment, after verification of the subset of verification values and check values, the current data string, the current set of verification values and the set of check values are discarded, with the host storing the pending and next data strings and sets of verification values, and the next set of check values.

In either embodiment, the authentication process may also include the transmission of the current data string from the host computer to the remote computer device, to check the synchronisation between the host and the remote user.

In the first embodiment, this transmission of the current data string forms the first data transmission, making four transmissions in all.

In the second embodiment, this transmission can be combined with the transmission of the random subset, so that there are still only two transmissions of data.

If the subset of the current set of secret keys is chosen by the remote computer device and the host, the number of data transmissions in the first embodiment remains the same, as the necessary data transfers can be included in the first two transmissions. In the second embodiment, the number of data transmissions increases.

According to a second aspect of the invention, we provide a method of authenticating a remote user at a host computer in accordance with the first aspect of the invention.

Other aspects of the invention relate to the host computer arranged to operate in accordance with the first aspect of the invention, a remote computer device arranged to operate in accordance with the first aspect of the invention, a computer network arranged to operate in accordance with the first aspect of the invention and a system comprising at least a host computer and a remote computer arranged to operate in accordance with the method of the first aspect of the invention.

Further aspects of the invention relate to means for implementating the instructions of the method of the first aspect of the invention including providing instructions on a computer readable medium, providing instructions in the form of a computer readable signal and providing instructions by way of a computer useable medium having the computer readable program code means embodied therein.

A still further aspect of the invention relates to a computer program comprising code for carrying out the method of the first aspect of the invention.

Embodiments of the invention will now be described in detail. In the description, the host computer is signified by H, and the remote computer device by U, and it is required to set up a method of authenticating a user of the remote computer device U to the host computer H.

To start with, two system parameters t and r are selected, where t and r are positive integers satisfying r<t. The choice of these values affects the security of the method. A method for computing MACs (Message Authentication Codes) must also be agreed; this could be HMAC (Hash-based function MAC) or a block cipher based CBC-MAC (Cipher block chaining MAC), as described for example in ISO/IEC 9797. Whatever method is chosen must be resistant to both key recovery and forgery attacks. In fact, resistance to a slightly generalised version of key recovery is required. Key recovery attacks normally involve an attacker using a number of (message, MAC) pairs to find the key used to generate the MACs. Here, the attacker should not be able to find any key which maps a given message to a given MAC, regardless of whether or not it was the actual key used. By choosing the algorithm and algorithm parameters carefully, it should be possible to achieve the desired attack resistance.

For the purpose of the discussion below $M_K(X)$ is used to denote the MAC computed on data X using a secret key K.

Initially, the host H and remote computer device U have a secure exchange of information, where U supplies H with public information.

In a first embodiment, to set up the system the remote computer device U chooses a set of t secret keys for the MAC algorithm, denoted by $K_1, K_2, \ldots, K_t$. U then chooses a random data string X and computes $$V_i = M_{K_i}(X)$$

for every i ($1 \leq i \leq t$). U then:

passes the values $V_1, V_2, \ldots, V_t$ and X to H, and securely stores $K_1, K_2, \ldots, K_t$ and X.

H securely stores $V_1, V_2, \ldots, V_t$ and X as the public verification information for U. The integrity of this information must be preserved, but secrecy is not required.

In use, the remote user wishes to authenticate him/herself to host H. The process operates in accordance with the following protocol.

1. H first sends X to U.
2. U first checks the correctness of X, in case of loss of synchronisation between U and H. If X is incorrect then, in certain circumstances, U may check the previous value of X to see if synchronisation can be restored (as discussed further below). U then chooses a new set of t secret keys: $K'_1, K'_2, \ldots, K'_t$ and selects a new random value X'. U also computes two sequences of t values:

$$V'_i = M_{K'_i}(X), W'_i = M_{K_i}(V'_1 \| V'_2 \| \ldots \| V'_t), (1 \leq i \leq t)$$

where here, as throughout, $\|$ denotes concatenation of data items.

U now sends $(W'_1, W'_2, \ldots, W'_t)$ to H.

3. H then chooses, at random, an r-subset of $\{1, 2, \ldots, t\}$, and sends this subset to U. U selects r secret keys $K_{x1}, K_{y2}, \ldots, K_{xr}$ in accordance with the r-subset sent by U.
4. U now sends the r secret keys $K_{i1}, K_{i2}, \ldots, K_{ir}$ to H, as well as the set of t values $V'_1, V'_2, \ldots, V'_t$ and the value X'.
5. H now verifies the r MAC values $V_{i1}, V_{i2}, \ldots, V_{ir}$ using the set of r keys supplied by U and the stored value of X. If all these values are correct, then H also verifies the r MAC values $W'_{i1}, W'_{i2}, \ldots, W'_{ir}$ using the set of r keys supplied by U and the values $V'_1, V'_2, \ldots, V'_t$ supplied by U previously. If all these MACs are also correct, then H accepts U as valid, and replaces $X, V_1, V_2, \ldots, V_t$ with X', $V'_1, V'_2, \ldots, V'_t$.

First, considering how t and r should be chosen, to avoid certain attacks, these values should be chosen so that the probability of a third party successfully guessing the subset $\{i_1, i_2, \ldots, i_r\}$ in advance is negligible.

That is we wish to arrange things so that $$1 / \binom{t}{r}$$

is negligible.

$$\binom{t}{r}$$

denotes the number of ways of choosing r from t, that is $t!/r!(t-r)!$.

Given that t should be minimised (to minimise the storage and bandwidth requirements) then this probability is minimised by choosing $r = \lfloor t/2 \rfloor$ (where r = the integer part of t/2), since $$\binom{t}{\lfloor t/2 \rfloor} \geq \binom{t}{i}$$

for all i. Also, since $$\sum_{i=0}^{t} \binom{t}{i} = 2^t,$$

this gives $$\binom{t}{\lfloor t/2 \rfloor} > 2^t / (t+1) \text{ if } t > 1.$$

Hence, if it is necessary to guarantee that the probability of successfully guessing the subset is at most $10^{-9}$ say, then choosing $t \geq 35$ will suffice.

Next, looking at host impersonation attacks, suppose a third party, E say, wishes to impersonate H to U with a view to learning enough to impersonate U to H at some subsequent time. In step 3 of the protocol, E can only choose a random r-subset of $\{1, 2, \ldots, t\}$, and E will then learn a set of r of the secret keys. However, at a later stage, when E impersonates U to H, E will only be successful if he/she knows all the keys in the subset chosen by H. The odds of this will be acceptably small as long as t and r are chosen appropriately, as discussed above.

A man in the middle attack must also be considered. As with any authentication protocol, it will always be possible for a third party E to simply sit between U and H in the communications channel, and relay messages between the two. This only becomes a genuine threat if E is able to change some part of the messages, and/or to re-order them in some way. We now look at the various messages in turn, to see if this is possible.

In step 2, E could change some or all of the MAC values $W'_i$.

However, given that at this stage E will not know any of the keys $K_i$, the probability that the modified values will be correct is negligibly small (since it is assumed that forgery attacks are not feasible).

In step 3, E could change the subset, but then the set of keys returned in step 4 will not be correct.

In step 4, E could modify some or all of the secret keys $K_{i_j}$, and/or some or all of the MAC values $V'_i$. Successfully changing the values $V'_i$ would require knowledge of the keys $K'_i$, but none of these have yet been divulged by U. Changing the secret keys $K_{i_j}$ is prevented by the fact that H can check them using the values $V_{i_j}$. (Changing these verification MACs would have required knowledge of the previous set of keys, and changing these previous keys would have required changing the previous verification MACs, and so on).

There is, of course, a simple and effective 'denial of service' attack against the protocol. A third party E can simply engage in the protocol with U by impersonating H. When U tries to authenticate him/herself to the genuine H, U will have a different value X to that sent by H in the first step of the protocol.

There are two main ways in which this can be dealt with. Firstly, U could simply abandon the attempt to authenticate to H, and arrange for the system to be re-initialised. Secondly, U could retain 'old' values of X (along with the associated set of keys) and use them to complete the authentication protocol. However, such a process has very serious dangers, depending on the choices of t and r.

With r set to $\lfloor t/2 \rfloor$, even doing the process twice would completely destroy the system security. A malicious third party E could impersonate H to U twice, using two disjoint r-subsets of $\{1, 2, \ldots, t\}$. This would mean that E would obtain all of the keys $K_1, K_2, \ldots, K_t$ (or all but one of them if t is odd). As a result, E would be able to impersonate U to H any number of times.

Hence if the same set key is allowed to be used more than once then r and t need to be chosen appropriately. Also, U needs to implement a counter to limit the number of times any particular key set is used for the authentication process. The limit for this counter will be determined by the choices for t and r, as discussed in more detail below.

Thus, one way of limiting the impact of denial of service attacks by malicious third parties impersonating the host, is to allow a key set to be used more than once. This may also be necessary if the authentication process between user and host fails part way through, e.g. because of a communications failure.

If a key set is to be used up to a maximum of c times (this being enforced by the counter held by U) then it should be the case that any party with knowledge of c different random r-subsets of the set of t keys $K_1, K_2 \ldots, K_t$ should have a negligible probability of knowing all the members of another randomly chosen r-subset of keys.

To compute the necessary probabilities simplifying assumptions (pessimistic from the point of view of the legitimate users) are made. Suppose that, by bad luck or by host impersonation, all the c different r-subsets are mutually disjoint. This requires the probability is small that a randomly chosen r-subset of $\{1, 2, \ldots, t\}$ does not contain any element from a specified subset of size t-cr.

So, suppose c, r and t are positive integers satisfying $r(c+1) < t$. If S is a subset of $\{1, 2, \ldots, t\}$ of size cr, then the probability that R, a randomly chosen r-subset of $\{1, 2, \ldots, t\}$, is a subset of S is equal to $$\frac{\binom{cr}{r}}{\binom{t}{r}}.$$

Then the requirement is that c, r and t should be chosen so that $$\frac{cr(cr-1)\ldots(cr-r+1)}{t(t-1)\ldots(t-r+1)}$$

which is bounded above by $(cr/t)^r$, is small. As an example, putting r=32 and t=64c, guarantees that the probability of a successful attack is less than $2^{-32}$.

The first embodiment of the protocol minimises the memory needed to store the necessary data, but requires four transmissions of data between the remote computer device and the host. In a second embodiment, steps 1 and 2 can be merged with steps 3 and 4 respectively, to give a two-pass protocol. This is at the cost of increasing long-term storage requirements. The second protocol operates as follows.

In the set up phase, the remote computer device U chooses two sets of t secret keys for the MAC algorithm, the current set, denoted by $K_1, K_2, \ldots, K_t$, and the pending set, denoted by $K'_1, K'_2, \ldots, K'_t$. U chooses two random data strings used as key set indicators, denoted by X and X' (for the current and pending key sets). U now computes verification MACs for both the current and pending key sets as $$V_i = M_{K_i}(X) \text{ and } V'_i = M_{K'_i}(X')$$

for every i ($1 \leq i \leq t$). U then also computes a further set of t MACs $$W'_i = M_{K'_i}(V'_1 \| V'_2 \| \ldots \| V'_t), (1 \leq i \leq t).$$

U then:
passes the two sets of verification values and the corresponding key set indicators $(V_1, V_2, \ldots, V_t, X)$ and $(V'_1, V'_2, \ldots, V'_t, X')$ to H,
passes the t MACs $(W'_1, W'_2, \ldots, W'_t)$ to H, and
securely stores the two key sets with their respective indicators, i.e.
$(K_1, K_2, \ldots, K_t, X)$ and $(K'_1, K'_2, \ldots, K'_t, X')$.

H securely stores the information received from U. The integrity of this information must be preserved, but secrecy is not required.

In use, the remote user wishes to authenticate him/herself to host H. The process operates as follows.

1. H chooses a random r-subset of $\{1, 2, \ldots, t\}$, say $\{i_1, i_2, \ldots, i_r\}$, and sends this subset to U along with the current key set indicator X.
2. U first checks the correctness of X, in case of loss of synchronisation between U and H. If X is incorrect then, in certain circumstances, U may check the previous value of X to see if synchronisation can be restored (as discussed previously).

U then chooses a new set of t secret keys: $K''_1, K''_2, \ldots, K''_t$ and selects a new random key set indicator X". U also computes two sequences of t values:

$$V''_i = M_{K''_i}(X''), W''_i = M_{K''_i}(V''_1 \| V''_2 \| \ldots \| V''_t), (1 \leq i \leq t).$$

U now sends X", $(V''_1, V''_2, \ldots, V''_t)$ and $(W''_1, W''_2, \ldots, W''_t)$ to H.

U also sends the r secret keys $K_{i1}, K_{i2}, \ldots, K_{ir}$ to H.

3. H now verifies the r MAC values $V_{i1}, V_{i2}, \ldots, V_{ir}$ using the set of r keys supplied by U and the stored value of X. If all these values are correct, then H also verifies the r MAC values $W'_{i1}, W'_{i2}, \ldots, W'_{ir}$ using the set of r keys supplied by U and the stored values $V'_1, V'_2, \ldots, V'_t$. If all these MACs are also correct, then H accepts U as valid, and replaces:

$X, V_1, V_2, \ldots, V_t$ with $X', V'_1, V'_2, \ldots, V'_t$,
$X', V'_1, V'_2, \ldots, V'_t$ with $X'', V''_1, V''_2, \ldots, V''_t$,
$W'_1, W'_2, \ldots, W'_t$ with $W''_1, W''_2, \ldots, W''_t$ It is also relevant to consider the storage, computation and communications complexity of the embodiments of the protocol.

Storage: for the first embodiment, the requirements for the host are to store t MACs and a random value; the requirements for the user are to store t keys. During execution of the protocol, the remote user and host must both store a further 2t MACs, and the user must also temporarily store an additional t keys. For the second embodiment, the long term storage requirements for host and user increase to 3t MACs and 2t secret keys respectively. Further, if the user retains 'old' key sets for resynchronisation purposes, then this will be at a cost of t keys, a random value and a usage counter for each retained old set.

Computation: for both embodiments, the host verifies 2r MACs and chooses one random r-subset of $\{1, 2, \ldots, t\}$, and the user generates 2t MACs.

Communications: the user sends the host a total of 2t MACs, one random value and r secret keys, and the host sends the user one r-subset of $\{1, 2, \ldots, t\}$.

To see what this might mean in practice, suppose the first embodiment is used in such a way that a particular key set can be used up to c=3 times, and that the user retains one 'old' key set for resynchronisation purposes. We thus choose r=32 and t=196. Suppose that the MAC in use is HMAC based on SHA-1 (secure hash algorithm—see ISO/IEC 9792-2 and 10118-3) with MACs and keys of 160 bits each, suppose also that X contains 128 bits. Then the user must store 2t keys, two random values and a counter (which we ignore since it will take negligible space)—this amounts to 392×20+32 bytes, i.e. just under 8 kbytes, with an additional 12 kbytes of short term storage needed during protocol execution). The host must store approximately 4 kbytes of MACs, with an additional 8 kbytes of short term storage needed during protocol execution. During use of the protocol the user will need to compute 392 MACs and the host 64 MACs. The total data to be exchanged between host and user during the protocol amounts to around 8.5 kbytes.

A further modification to both embodiments can be used to improve security. In cases where c>1, i.e. where key sets may be used more than once, a malicious entity impersonating the host is free to choose the subsets $\{1, 2, \ldots, r\}$ disjointly so as to learn the maximum number of secret keys. This maximises the (small) probability this malicious entity will have of impersonating the user to the genuine host. To avoid this, i.e. to increase the difficulty of launching a host impersonation attack, we can modify the protocol so that neither the remote user nor the host chooses the r-subset $\{i_1, i_2, \ldots, i_r\}$ of $\{1, 2, \ldots, t\}$. This can be achieved by prefixing the second embodiment with two additional messages, and also making use of an appropriate one-way, collision-resistant hash-function, that is, one where the input to the hash-function cannot be reconstructed from the output, and where it is computationally infeasible to find two different inputs that will produce the same output. These two additional messages can be merged with the first two messages of the first embodiment.

The revised protocol of the second embodiment is as follows:

1. H chooses a random value $r_H$, of length comparable to the key length in use, computes $h(r_H)$ (where h is a pre-agreed hash-function), and sends $h(r_H)$ to U.
2. U chooses a random value $r_U$, of length the same as $r_H$, and sends it to H.
3. H computes $h(r_H\|r_U)$ and uses this to seed a pseudo-random number generator (PRNG) of appropriate characteristics to generate an r-subset $\{i_1, i_2, \ldots, i_r\}$ of $\{1, 2, \ldots, t\}$—this PRNG could, for example, be based on h. H now sends $r_H$ and X to U.
4. U first checks $r_H$ using the value $h(r_H)$ sent previously. U now re-computes the r-subset $\{i_1, i_2, \ldots, i_r\}$, and continues as in step 2 of the second embodiment.

Note that, by sending $h(r_H)$ in the first step, H commits to the random value $r_H$ without revealing it. This prevents either party learning the other party's random value before choosing their own. This, in turn, prevents either party choosing even a small part of the r-subset. Further, although this scheme lengthens the protocol, it also slightly reduces the communications complexity, since the r-subset no longer needs to be transferred.

The authentication protocols described have the advantage of using symmetric cryptography and only require public information to be stored at the verifying host. The computational and storage requirements are non-trivial, but may still be potentially attractive to designers of low-cost remote user authentication devices who wish to avoid the complexity of implementing digital signatures.

The invention claimed is:

1. A method of authenticating a remote user to a host computer in a data communication system where a remote computer device is used by said remote user, in which said host computer stores a current data string and a current set of verification values, said current set of verification values calculated by said remote computer device using said current data string and a current set of secret keys, said current set of secret keys being chosen and stored by said remote computer device, said method including:
    at said remote computer device, choosing a next data string and a next set of secret keys, calculating said next set of verification values using said next data string and said next set of secret keys, and calculating a set of check values using said next set of verification values and said current set of secret keys;
    transmitting said next data string, said next set of verification values and said set of check values in encrypted form from said remote computer device to said host computer;
    at said host computer, choosing at random, identifiers of a subset of said current set of keys, and obtaining that subset of said current set of keys in encrypted form from said remote computer device;
    at said host computer, verifying said corresponding subset of said current set of verification values using said current data string and said subset of said current set of keys;
    then the verification of said corresponding subset of said set of check values using said next data string and said subset of said current set of keys; and
    the replacement of said current data string and current set of verification values with said next data string and next set of verification values.

2. A method of authenticating a remote user to a host computer as claimed in claim 1, in which said host computer verifies said next set of verification values before storing them in place of said previous set.

3. A method of authenticating a remote user to a host computer as claimed in claim 1, in which a message authentication code algorithm is used to calculate each set of verification values.

4. A method of authenticating a remote user to a host computer as claimed in claim 1, in which the number of said secret keys in a set is between 35 and 200, and said number of secret keys in said subset is less than or equal to half of the number in said whole set.

5. A method authenticating a remote user to a host computer as claimed in claim 1, in which a procedure involving both said remote computer device and said host computer is used to chose the subset of said current set of secret keys.

6. A method of authenticating a remote user to a host computer as claimed in claim 1, in which said host computer stores one data string and one set of verification values, while said remote computer device stores one set of secret keys and said data string, and during said authentication process there are three transmissions of data, firstly from said remote computer device to said host, sending said next data string, said next set of verification values and said set of check values, secondly from said host to said remote computer device sending said subset chosen at random, and thirdly from said remote computer device to said host, sending said subset of said current set of keys.

7. A method of authenticating a remote user to a host computer as claimed in claim 1, in which said host computer stores current and pending data strings, the corresponding two sets of verification values, each calculated from a corresponding set of secret keys, and a set of check values, while said remote computer device stores said two sets of secret keys and said current and pending data strings, and during said authentication process there are two transmissions of data, firstly from said host to said remote computer device sending said subset chosen at random and secondly from said remote computer device to said host, sending said subset of said current set of keys, together with said next data string, said next set of verification values and said corresponding set of check values.

8. A method of authenticating a remote user to a host computer as claimed in claim 7, in which, after verification of said subset of verification values and check values, said current data string, said current set of verification values and said set of check values are discarded, with said host storing said pending and next data strings and sets of verification values, and said next set of check values.

9. A method of authenticating a remote user to a host computer as claimed in claim 6, in which said authentication process also includes said transmission of said current data string from said host computer to said remote computer device, to check said synchronisation between said host computer and said remote user.

10. A method of authenticating a remote user to a host computer as claimed in claim 6, in which said transmission of said current data swing forms a further data transmission preceding said three transmissions of data.

11. A method of authenticating a remote user to a host computer as claimed in claim 7, in which said transmission of said current data string is combined with said transmission of said random subset.

12. A host computer arranged to operate in accordance with the appropriate parts of the method of claim 1.

13. A remote computer device arranged to operate in accordance with the appropriate parts of the method of claim 1.

14. A computer network in which computers associated with said network can be arranged to operate as said host computer and remote computer device in accordance with the method of claim 1.

15. A system for authenticating a remote user to a host computer comprising at least;
- a remote computer;
- a host computer; and
- a first processor associated with the host computer and a second processor associated with the remote computer;
- wherein said processor carries processors carry out instructions in accordance with the method of claim 1.

* * * * *